(No Model.) 7 Sheets—Sheet 1.
W. W. COTTON & A. HEWES.
PAPER BAG MACHINE.

No. 312,257. Patented Feb. 17, 1885.

Witnesses
Henry Gatling
Andrew Wilson

Inventor
W. W. Cotton
Alfred Hewes (No Model.) 7 Sheets—Sheet 2.
W. W. COTTON & A. HEWES.
PAPER BAG MACHINE.

No. 312,257. Patented Feb. 17, 1885.

Witnesses:
Henry Gidlings
Andrew Wilson.

Inventor
W. W. Cotton
Alfred Hewes (No Model.) 7 Sheets—Sheet 3.
W. W. COTTON & A. HEWES.
PAPER BAG MACHINE.
No. 312,257. Patented Feb. 17, 1885.

Witnesses:
Henry Pickling
Andrew Wilson

Inventor
W. W. Cotton
Alfred Hewes (No Model.) 7 Sheets—Sheet 4.
W. W. COTTON & A. HEWES.
PAPER BAG MACHINE.
No. 312,257. Patented Feb. 17, 1885.
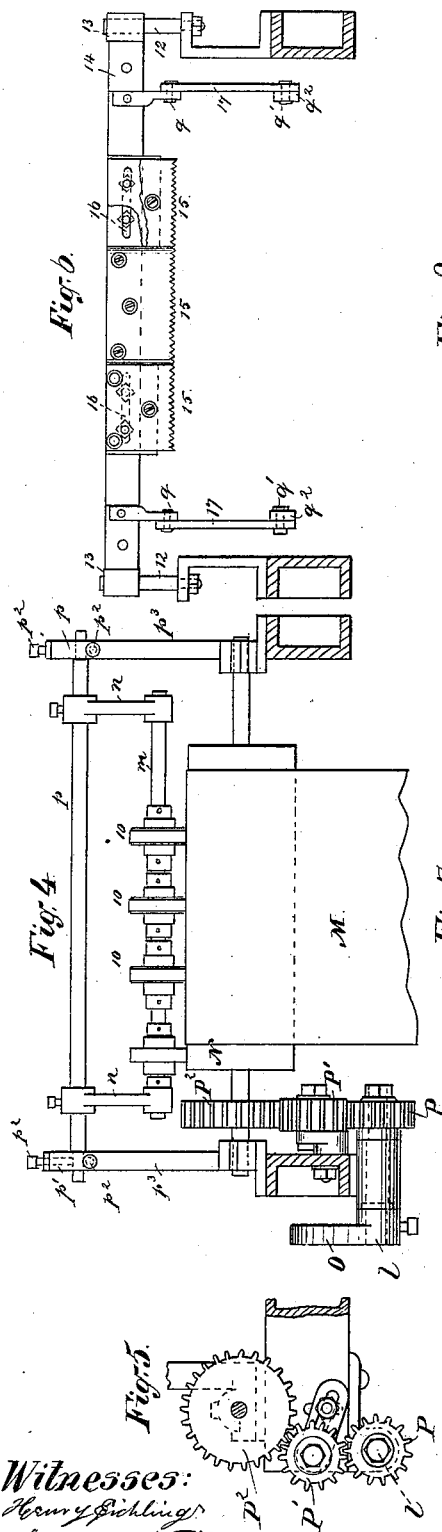
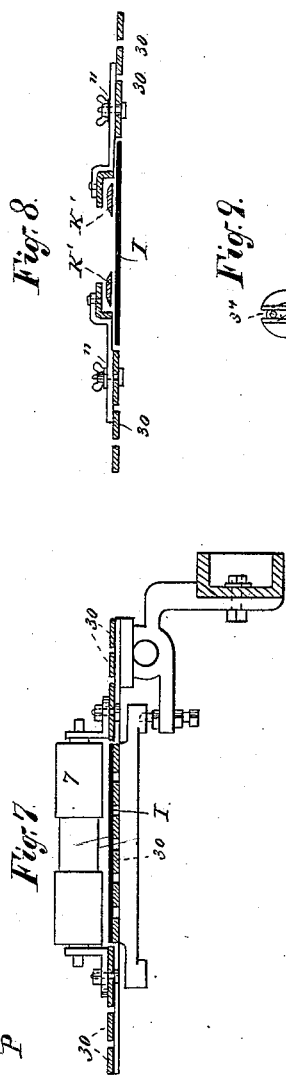
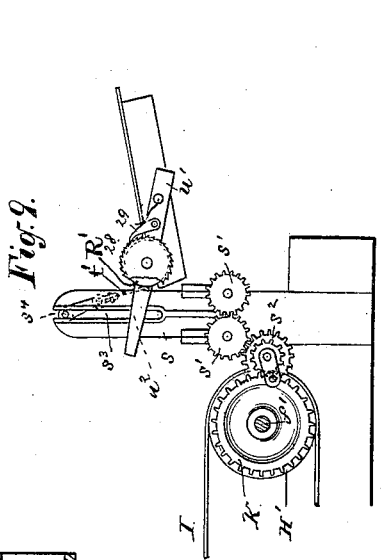
Witnesses:
Henry Pichling
Andrew Wilson
Inventor
W. W. Cotton
Alfred Hewes (No Model.) 7 Sheets—Sheet 5.
W. W. COTTON & A. HEWES.
PAPER BAG MACHINE.

No. 312,257. Patented Feb. 17, 1885.

Witnesses:

Inventor (No Model.) 7 Sheets—Sheet 6.
W. W. COTTON & A. HEWES.
PAPER BAG MACHINE.
No. 312,257. Patented Feb. 17, 1885.
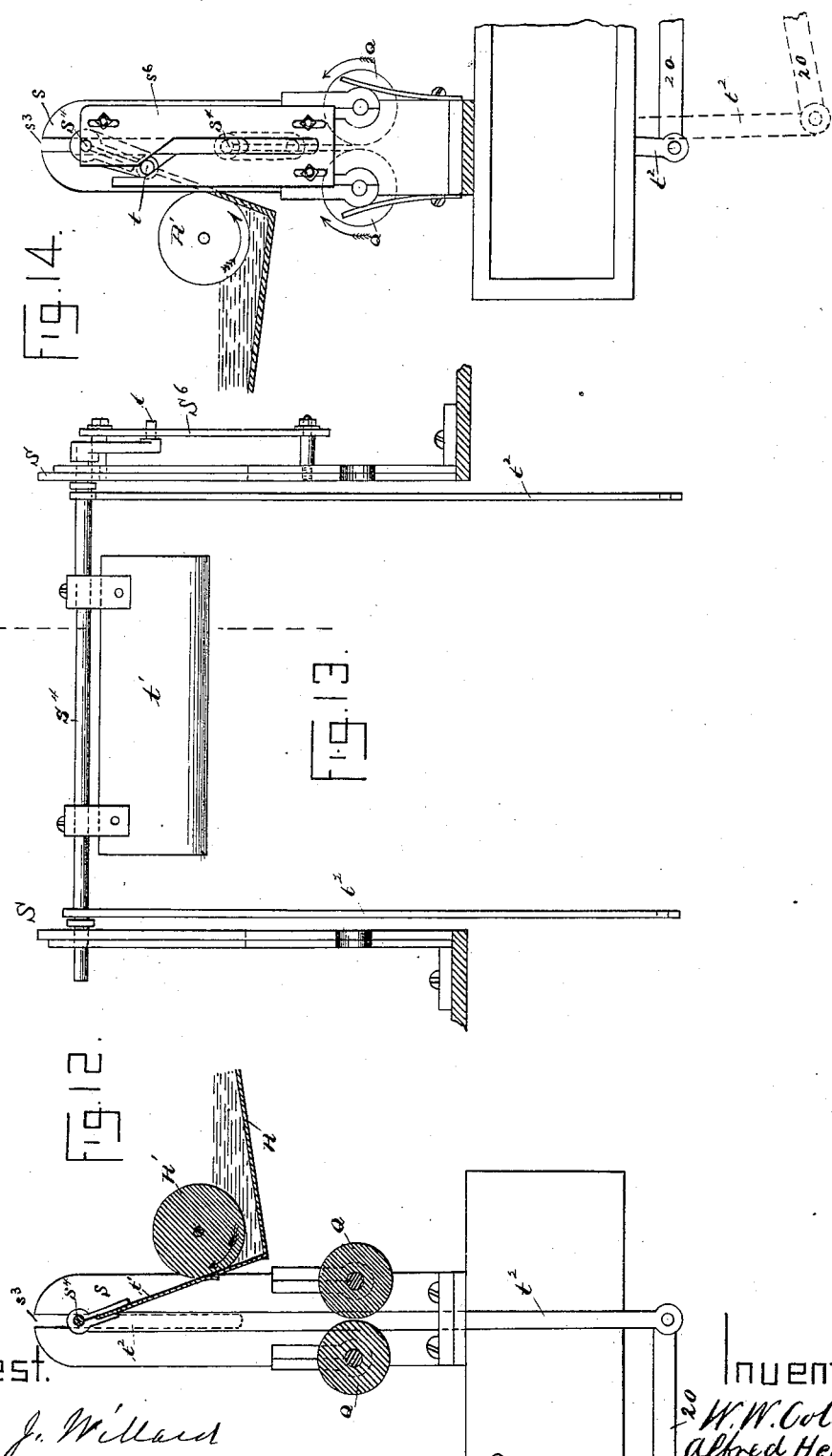

(No Model.) 7 Sheets—Sheet 7.
W. W. COTTON & A. HEWES.
PAPER BAG MACHINE.

No. 312,257. Patented Feb. 17, 1885.

Attest.
A. J. Willard
Amos Cadley

Inventor:
W. W. Cotton
Alfred Hewes
By A. Bell
atty.

UNITED STATES PATENT OFFICE.

WILLIAM W. COTTON AND ALFRED HEWES, OF BROOKLYN, ASSIGNORS, BY MESNE ASSIGNMENTS, OF ONE-HALF TO THE FISHKILL MANUFACTURING COMPANY, OF NEW YORK, N. Y.

PAPER-BAG MACHINE.

SPECIFICATION forming part of Letters Patent No. 312,257, dated February 17, 1885.

Application filed November 21, 1882. (No model.)

*To all whom it may concern:*

Be it known that we, WILLIAM W. COTTON and ALFRED HEWES, citizens of the United States and of the State of New York, residing at Brooklyn, Kings county, in said State, have invented certain new and useful Improvements in Paper-Bag Machines, of which the following is a specification.

Our invention relates to paper-bag machines in which the paper is fed in at one end, is folded and cut and pasted, and delivered at the other end of the machine in a perfectly-formed bag, ready for use, said bag having a center seam.

Figure 1:
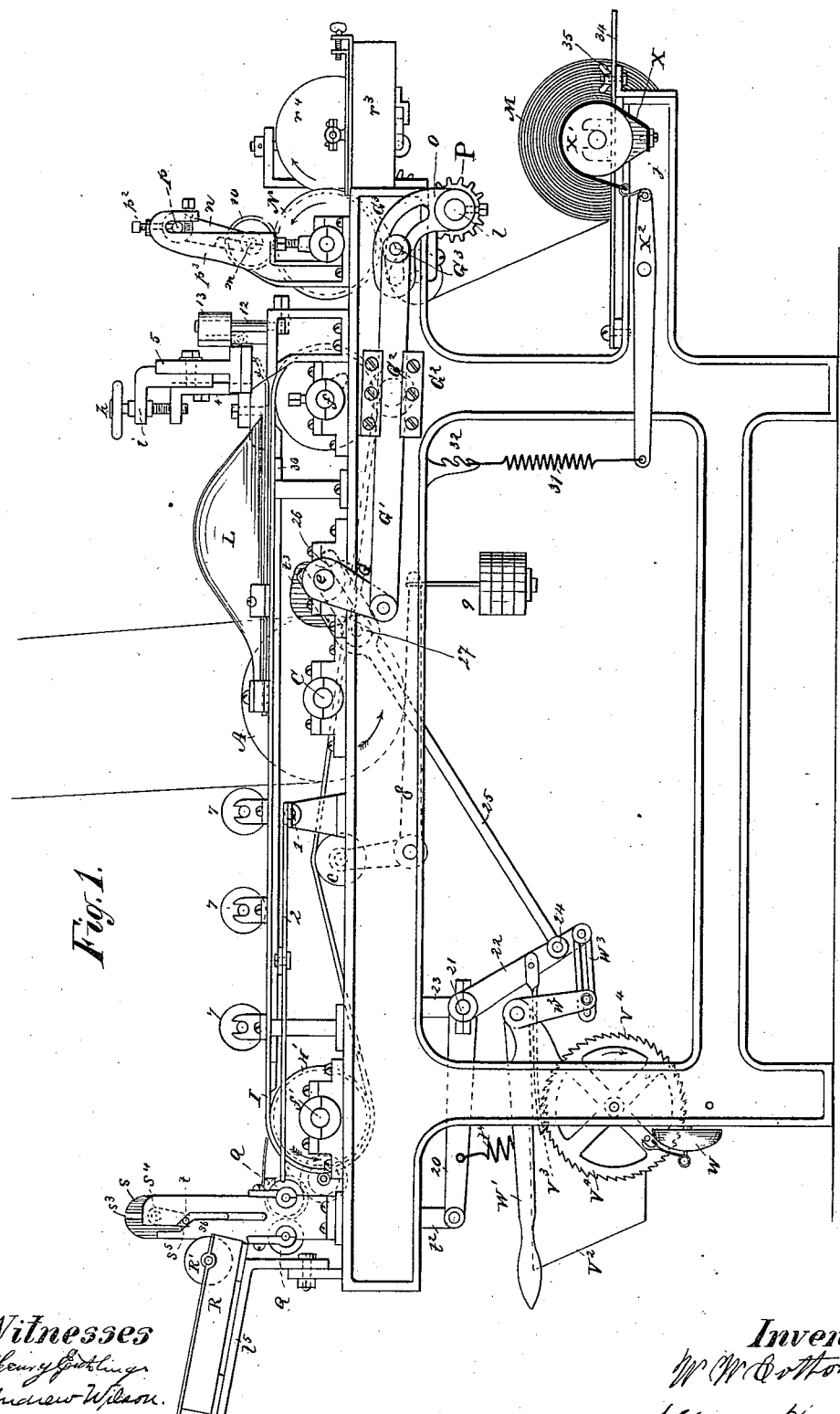
Figure 2:
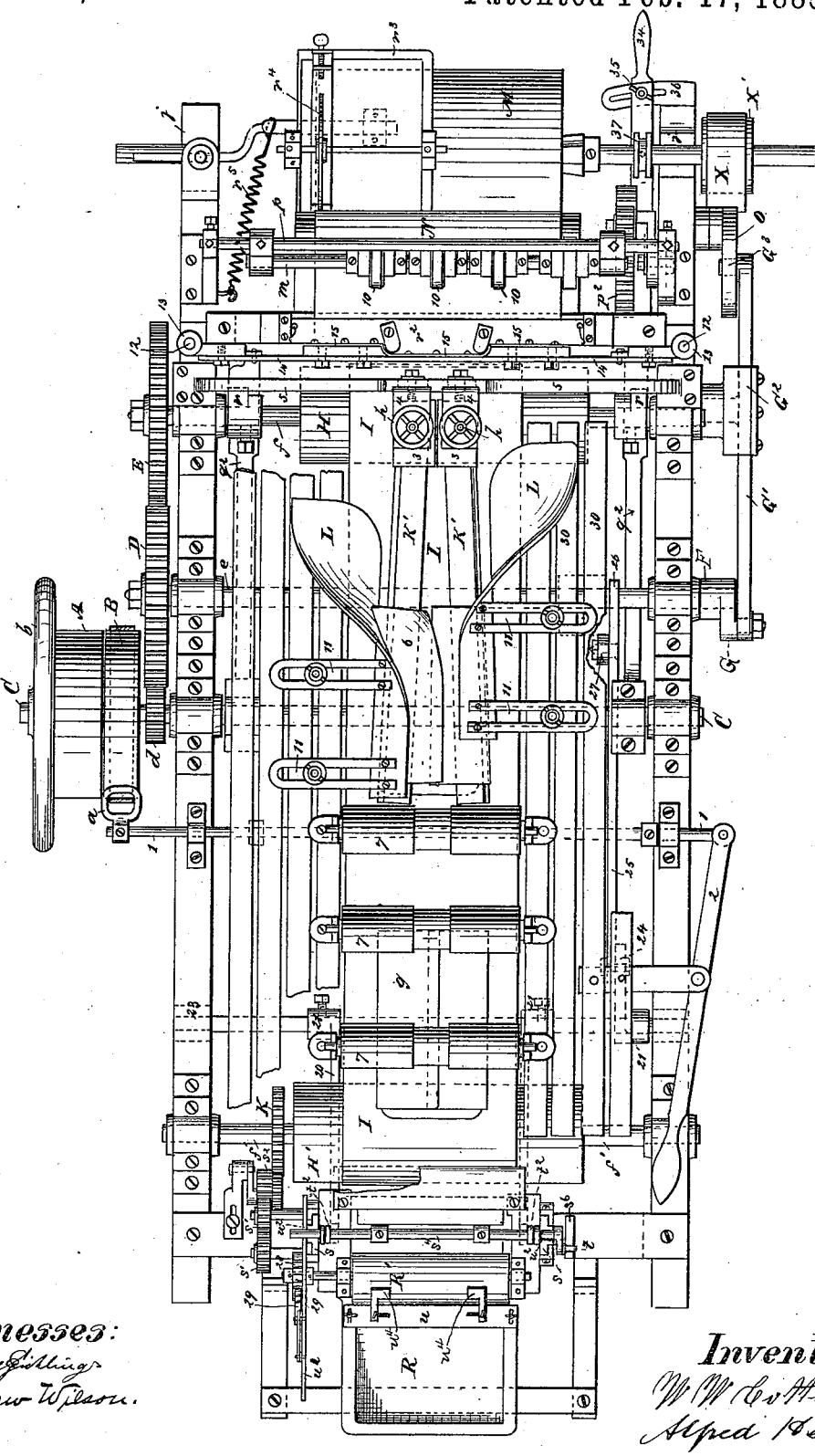
Figure 3:
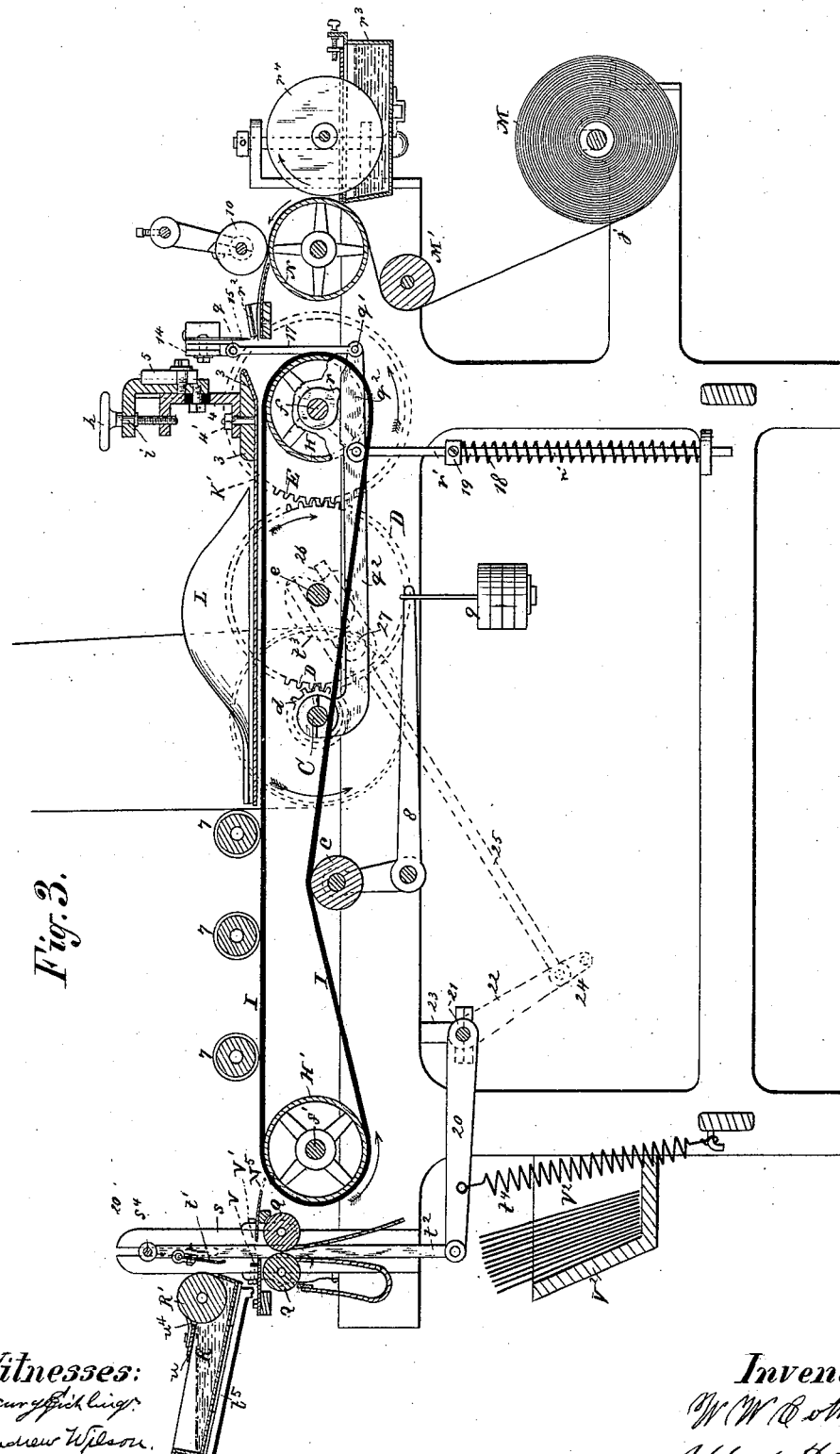
Figure 10:
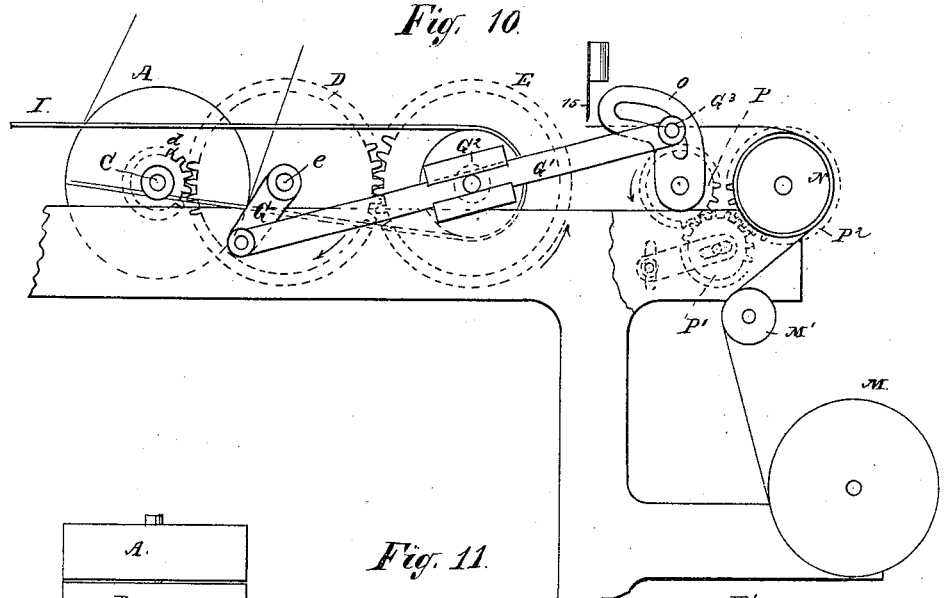
Figure 11:
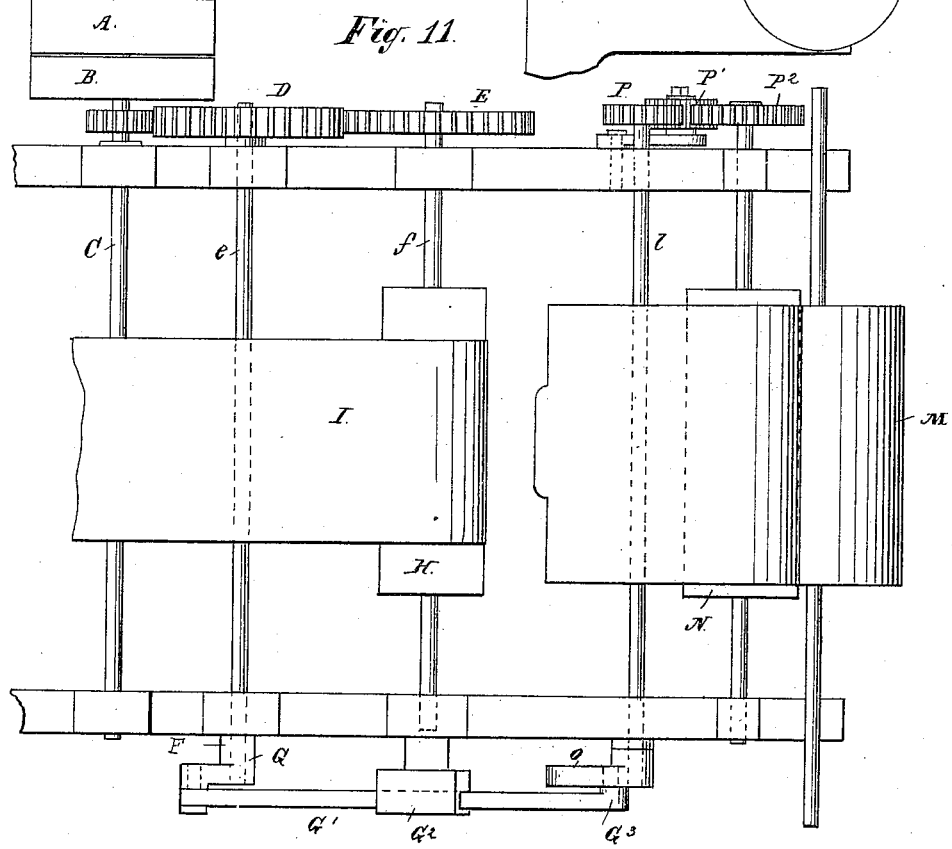
Figure 15:
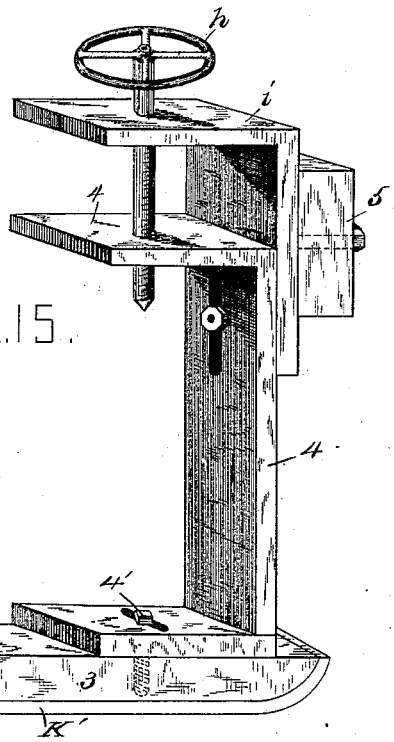
Figure 16:
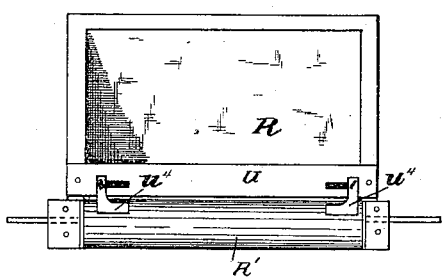
Figure 17:
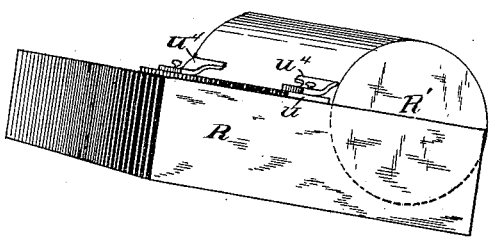

Figure 1 is a vertical side view of the machine. Fig. 2 is a plan view of the same. Fig. 3 is a vertical longitudinal sectional view of the same. Fig. 4 is a detailed face view of the arrangement of certain gear-wheels connecting with the feeding portion of the machine. Fig. 5 is a detailed view of the gearing mechanism of the same. Fig. 6 is a vertical detailed face view of the cutting-knife, showing the parts by which it is adapted to the rest of the machine. Fig. 7 shows a wooden roller, situated over the belt. Fig. 8 is a transverse sectional view of the mechanism that folds the blank into tubular form, drawn on line *x* of Fig. 1. Fig. 9 is a vertical side view of the belt and device to fold, paste, and press the end or bottom of the bag. Fig. 10 is a side elevation of a portion of the machine, showing the connecting gear-wheels with the feeding portion of the machine and the driving-wheel. Fig. 11 is a plan view of the same portions of the machine as shown in Fig. 10, with the gear-wheels for moving the feeding-cylinder. Fig. 12 is a vertical sectional view of the paste-blade frame, paste-box, roller, and pressing-rollers. Fig. 13 is a rear elevation of the paste-blade, frame in which it operates, and the vertical rods through which it receives its up-and-down motion. Fig. 14 is a vertical side view of the paste-blade frame, showing the cam-plate which deflects the blade against the paste-roller. Fig. 15 is a perspective elevation of the mechanism for adjusting the fingers which hold the paper in proper position upon the belt. Fig. 16 is a top plan view of the paste-box and paste-roller, showing scraper and guide attachment thereon. Fig. 17 is a perspective elevation of the paste box and roller, showing scraper and guide attachment thereon.

Similar letters and figures of reference designate similar parts in the several drawings.

A is a driving-pulley onto which the driving-belt is placed through the belt-shifter *a*. B is the loose pulley, and *b* is a hand-wheel secured to the pulley A and to the shaft C to turn the same by hand. C is the main driving-shaft, extending across the machine, and onto which are placed the pulleys A and B and hand-wheel *b*.

The letter *d* shows a gear-wheel secured to the driving-shaft C and gearing with a wheel, D, and this latter gear-wheel, D, gears with another wheel, E. The shaft *e* for the gear-wheel D likewise extends across the machine, and has attached to its end at F the crank G, that operates the mechanism for feeding in the paper. The shaft *f*, which carries the gear-wheel E, likewise extends across the machine. These three shafts, C, *e*, and *f*, have a continuous motion imparted to them from the driving belt and shaft. The rapidity of their revolution can be made greater or less, as desired, by the use of different-sized pulleys. The shaft *f* carries a cylinder, H, around which a belt, I, passes. This belt I extends to and around another cylinder, H', secured to the shaft *f'*. The shaft *f'* also has upon it a gear-wheel, K, gearing with the device for pressing the bottom of the bags. The belt I has a continuous motion by virtue of shaft *f*, which has the same motion, derived, as previously described, from the gear-wheel D and wheel *d* on the driving-shaft C, so that this belt I carries forward toward the bottom-pasting device the paper blank *g*. Such an action is shown in Fig. 2.

As a means for stopping and starting the machine the belt-shifter *a* grasps the driving-belt. This belt-shifter is attached to the rod 1, extending to the lever 2, whereby the driving-belt is thrown off or onto the driving-pulley A and the loose pulley B at will.

Above the belt I are placed two fingers or guides, K' K'. They are held in place by being secured to the bevel-shaped pieces 3 3. These pieces 3 3 are secured to two uprights, 4 and 4, which are provided with elongated openings and set-screws 4' 4', so that the fingers can be moved sidewise.

At $h\ h$ are shown two screws, passing through bearings $i\ i$ and into the top of the uprights 4 and 4. By operating these screws $h\ h$ the uprights 4 4 are raised or lowered. A cross-bar, 5, attached to either side of the frame of the machine, supports the fingers, uprights, and screws. These fingers K' K', when set in position, are close upon the belt I, leaving just room enough for the paper, and yet close enough to cause friction between the belt and the paper, so that the paper will be carried forward. The paper enters under these fingers by passing under the beveled pieces 3 3, (well shown in Fig. 3,) and is caught by the belt and held very taut while the knife descends to cut the length of the blank.

At the side of and above the fingers K' K' are right and left folders L L. The central portion of the paper passes under the fingers, and the sides of the paper pass over and upon the folders, and these folders gradually turn over the sides of the paper, one side a moment sooner than the other, so that the side without paste upon it is underneath the other side, which has paste upon it.

Fig. 2 shows a blank in this position at 6, where the folders are above the fingers. In Fig. 8 a transverse sectional view of the fingers, with the folders above them, is shown. It is seen that the folders are so curved that they completely turn over the sides of the paper by the time the blank reaches its position at 6 in Fig. 2.

At 7 7 7 are rollers lying upon the belt I, under which the blank passes. Any number, one or more, of such rollers may be used as is found most desirable; or they may be dispensed with, as they are not needed except to guide the blank toward the bottom-pasting device, and are not near enough to it to hold the blank when the bottom is being folded or pasted.

Beneath the belt I is a roller, $c$, with a pivoted rod, 8, and weight 9, for the purpose of giving tension to the belt. (See Figs. 1 and 3.) This portion of our machine has a continuous motion, and imparts motion to the other parts now to be described.

M is the roll of paper, held in place by a rod passing through it and supported on projections $j\ j$ from the frame of the machine. The paper passes up around a roller, M', and over the feed-cylinder N. Running upon the paper as it passes over the cylinder N are a series of small wheels, 10 10 10. They are firmly held down upon the paper, and, in connection with the cylinder, by friction upon the paper, feed in the paper toward the knife. The cylinder N is made to revolve just the length of a blank. This is done by the following device:

The crank G and pitman G' are moving continuously by virtue of the continuous revolutions of the shaft $e$. Crank G describes a circle. Pitman G' moves backward and forward. The pitman G' passes through a pivoted guide-box, $G^2$, and at $G^3$ it is connected with a curved slotted crank, O. (See Figs. 1, 2, 4, and 11.) This slotted crank is secured to a shaft, $l$, on the end of which is a gear-wheel, P, (see Fig. 4,) and to give the proper direction and motion to the cylinder N, an intermediate gear, P', is made to connect with wheel P, and the wheel P' again gears with the wheel $P^2$, which is secured to the end of the shaft upon which is also the feed-cylinder N. As the crank G moves forward it carries the slotted crank O around, thus turning the gear-wheels P P' $P^2$ successively, and thus the cylinder N, with friction-rollers 10 10 10, feed in the paper. The pitman G' ceases to move the slotted crank O when it reaches the position shown in Fig. 1, and continues to slide forward in the slot of the crank until it reaches the end of the slot, when it again pulls the crank and starts the feed-cylinder. This sliding of the pitman G' in the slotted crank causes the feed-cylinder N to stop, and no more paper is at this time fed into the machine. The feeding device is now at rest; but the paper has during the feeding movement entered under the beveled pieces 3 3 and under the fingers K' K', and is held taut by them at one end upon the belt, and the feed-cylinder N and friction-rollers 10 10 10 hold the paper taut at the other end, and at this instant the knife 15, situated between these two points, descends and cuts off the paper the proper length of a bag. The length of a bag is regulated by the gear-wheel P', and it revolves the feed-cylinder more or less, as it is larger or smaller, and the length of time the feed-cylinder revolves determines the length of paper that is fed into the machine for the bag. Thus, it will be seen, one machine can make any-sized bag desired, the length of the bag being regulated as just described; and the width is regulated by the folders L L, which can be moved sidewise by means of the slots 11 11 11 and set-screws, Fig. 2, to fold any width of bag. The friction-rollers 10 10 10 must be pulled back and off of the feed-cylinder to place paper between them and the cylinder. To allow of this, the rollers 10 10 10 are placed on the rod $m$, and this rod is secured by the arms $n\ n$ to the cross-rod $p$, that swings and is held down in bearings $p'$ by set-screws $p^2\ p^2$ in uprights $p^3\ p^3$ from the frame of the machine. (See Fig. 4.)

The knife, to which allusion has just been made, can be of any form desired. It is made to cut from above downward. The uprights or rods 12 12 are secured to the frame of the machine, and rings 13 13 slide up and down these rods. To the rings is attached the cross-bar 14, and the knife or knives 15 15 15 are screwed to this cross-bar. We prefer to make the knives in sections, so each section can be removed for repairs, elongated horizontal holes being made in the side sections of the knife, as shown at 16 16, Fig. 6, for the purpose of fitting them close to the middle section.

Attached to the cross-bar 14 (see Figs. 3 and 6) are two arms, 17 17, working on pivots $q\ q$. These arms are pivoted at $q'\ q'$ to bars $q^2\ q^2$, Fig. 3, leading to the main driving-shaft C.

Attached to shaft $f$ on each side of the machine are two pear-shaped cams, $r\ r$, which revolve with the shaft $f$, and are secured by set-screws through them to said shaft $f$. They are so placed that they are over the bars $q^2\ q^2$, likewise on each side of the machine, leading to the knife, and the point of the cam strikes the bars $q^2\ q^2$ just at the instant when the crank G ceases to move the slotted crank O, and when the paper is at rest and held taut, and when the feed-cylinder has ceased to move. The points of these cams $r\ r$ press down the bars $q^2\ q^2$, which pull down the knife suddenly and it cuts off the paper for the bag. This cutting is done while the paper lies out flat under the fingers K' K' and before the sides of the bag are folded upon the folders L L. The knife is pushed up out of the way by springs 18 around the rods $r'$, acting against a shoulder or nut, 19, each rod $r'$ being pivoted to one of the bars $q^2\ q^2$ and passing through a guide-hole at its lower end in the frame of the machine, as shown in Fig. 3. We do not confine ourselves to this mode of springing the knife upward, as springs can be placed under the cross-bar 14, on top of the machine, and act in the same way to accomplish this result. Just in front of the knife is a removable strip, $r^2$, under which the paper passes, and which acts as a guide and to hold the paper down upon the machine.

A paste-box, $r^3$, supported on a swinging arm from the frame of the machine, and provided with a disk, $r^4$, to bring up the paste, is situated at one end of the feed-cylinder N, and the disk $r^4$ is brought in contact with the edge of the paper. (See Figs. 1, 2, and 3.) A spring, $r^5$, holds this paste-box firmly in place when set to work. This disk revolves by friction from the feed-cylinder and the paper, and leaves a continuous line of paste on the edge of the paper, and this edge of the paper is folded down by one of the folders L a moment later than the other edge, which has no paste on it, and this forms the center seam of the bag.

The bottom seam and fold of the bag is made by the following device:

Q Q, Figs. 1 and 3, are two rollers set in bearings in the uprights $s\ s$. The shafts of these rollers receive the gear-wheels $s'\ s'$, Fig. 9. $s^2$ is a gear-wheel gearing with one of the wheels $s'$, and with a wheel, K, on the belt-cylinder H', from which continuous motion is imparted to the rollers Q Q. The uprights or side plates, $s\ s$, have slots therein, $s^3\ s^3$, for the vertical movement of the horizontal rod $s^4$, to which the paste-blade $t'$ is attached. By means of an arm on the end of said rod and a finger, $t$, on said arm operating on cam-plate $s^6$, the lower edge of the paste-blade is deflected against the paste-roller R' by the upward movement of the horizontal rod $s^4$. (See Figs. 12, 13, 14.) The paste-blade is rounded at its lower edge slightly, so that when it is in contact with the roller R' this rounded edge is slightly removed from the roller and does not become covered with paste. This rounded edge is useful to prevent the paste from being delivered at too low a point in the bottom seam of the bag. If paste be too low down in the bottom seam, it will not hold the bottom seam secure enough to the body of the bag. (See Fig. 3, where this lower rounded edge of the paste-blade is plainly shown.) The vertical movement of horizontal rod $s^4$ and the mechanism by which the paste-blade $t'$ is deflected against paste-roller R' are shown in Figs. 1, 3, 9, 12, 13, and 14. The vertical rods $t^2\ t^2$ are connected with horizontal bar $s^4$, and at their lower ends are attached to a bell-crank lever having arms 20 22.

At 24 is pivoted the connecting-rod 25, reaching up and ending in two parallel tongues forming a U (see Fig. 3) at 26. The tongues of this U pass one on each side of the shaft $e$, and are thus held in proper position.

On the shaft $e$ is a heart or horseshoe shaped cam, $t^3$, revolving with the shaft $e$ continuously. At the base of the U is the friction-roll 27, which bears against the heart-cam $t^3$ continuously by force of the spring $t^4$, which is attached to the arm 20 and the frame of the machine. When the heart-cam has made one complete revolution, the paste-blade has descended and ascended once. The descent of the paste-blade is permitted when the cavity part of the heart-cam $t^3$ has revolved and comes next to the roll 27 at the bottom of the U, for this motion allows the shaft 25 to have an inclined upward movement, and by help of the spring pulls down the paste-blade, and, as the heart-cam continues to revolve, its extended portion presses the roll 27 away from it, and thus pushes the shaft 25 on an incline downward, and pushes up the paste-blade $t'$ to receive more paste. The arms $t^2$ and 20 act with the shaft 25 in these motions just described. The paste-box R rests on a frame, $t^5$, and is held in place by any suitable means, and is provided with a roller, R'. A scraper, $u$, Fig. 2, is brought in contact with the roller R', and scrapes off all unnecessary paste, and two slides, $u^4\ u^4$—one on each end of this scraper $u$—are set in place to gage on the roller the width of the paste to be taken up, so that no more paste is taken up than is required, nor is it wider on the roller, because of these slides, than the width of the bag to be pasted. These slides or gages may be of different widths, so as to regulate the paste upon the roller to conform to the width of the tubular blank to be folded and pasted. The paste-roller R' is made to revolve by means of the ratchet-wheel 28, on the end of the roller-shaft, and a pawl, 29. The pawl is mounted on a pivoted lever that is made heavy at the end $u'$, so it falls down of its own weight. The pawl catches in the teeth of the ratchet-wheel 28, and is held there by a spring. The rod $s^4$ in its descent strikes the end of the lever at $u^2$, Fig. 9, and pushes it down, and this revolves the roller R'. When the rod $s^4$ ascends, the lever returns to its normal position, as shown in Fig. 9, ready to again revolve the paste-roller R'. The paper bag is carried by the belt I onto the supporting-plate $V^5$, and the bottom end of the bag strikes against stops V, situated just above the two rollers Q Q, (best shown in Fig. 3,) and the end of the bag rests for an instant against these stops V and upon a small plate, V', in front of the stops V. The cross-bar $s^4$, with the paste-blade $t'$, having paste upon it, descends and strikes the bottom of the blank between the plate V' and supporting-plate $V^5$, which action takes the paste from the blade $t'$, and leaves it on the inside of the bottom seam of the bag, near the top of the seam. The paste-blade $t'$ also presses down the bottom end of the bag below said plates V' $V^5$, causing a small portion of the bottom end of the bag to fold upwardly, and this fold takes the paste from the blade on the inside of the fold. This action also drives the bottom end of the bag so folded and pasted down between the rollers Q Q, which press the bottom seam onto the body of the bag and close the seam, and the bag falls into the box $V^2$ below. At every upward movement of the cross-bar $s^4$ the pawl $V^3$ is carried forward, one tooth upon the ratchet-wheel $V^4$, and on the downward movement of the cross-bar $s^4$ the pawl $V^3$ is pulled back and turns the ratchet-wheel $V^4$, and when this wheel has been turned around fifty teeth a pin in its periphery strikes the bell W, and the attendant is notified to take out the bags and arrange them for binding. The cross-bar $s^4$ and paste-blade $t'$ can be held up and at rest to prevent paste from getting onto the rollers Q Q when the machine is being run without paper therein, as in starting it, or should the paper break. This is done by means of the handle W', lever $W^2$, and arm $W^3$. By raising the handle W', the lever $W^2$ and arm $W^3$ pull down the arm 22, and the arms 20 and $t^2$ raise up the cross-bar $s^4$ and paste-blade $t'$, and, when the bag is at its stops V, the handle W' is lowered and the bottom seam folded and pasted, as before.

The machine may be provided with longitudinal strips 30 30, to support the folders L L and rollers 7 7 7, and to add strength to the frame. Such strips may also be extended to the center of the machine and form a support for the belt.

To prevent the paper from unrolling too quickly, a friction-band, X, passes over a smooth collar, X', which is secured to the end of the axle or rod passing through the center of the roll of paper. The roll of paper being held tight to said axle by cones or in any other manner, the friction-band is then held down tight over the collar by the pivoted pressure-bar $X^2$. A spring, 31, acts to sustain one end of said pressure-bar and thus pull down the other end. Several hooks, 32, are arranged so the spring may be adjusted to secure any tension desired through the friction-band upon the roller.

In Fig. 1, between the roll of paper M and the friction-band X, is a handle, 34, pivoted to the frame of the machine, with a set-screw, 35, passing through the slotted piece 36, to hold the handle firm. Upon the rod which passes through the roll of paper is a grooved wheel, 37, which runs over a pin in the handle 34. By moving the handle either way horizontally the roll of paper is moved, and by this means can be kept in position to feed the sheet to the center of the cutting-knife and body of the machine, where the belt and folders will form the center seam in the center line of the blank.

The movement of this machine is such that the parts act in harmony, and the paper is fed in accurately and at the proper time, and the bag is completed in a perfect state. The several wheels revolve in the direction indicated by the arrows. The belt I, having a continuous motion, carries the blank away from the knife and up to the paste-blade in consecutively-measured intervals, and the hinged or swiveled pasting-blade strikes down to fold and paste the bottom of the bag, and send it down between the two pressing-rollers Q Q in time to make room for the next approaching blank.

What we claim as new is—

1. In a paper-bag machine, in combination with a vertical-acting paste-blade, horizontal rod $s^4$, crank-arm $t$, slotted side plate, $s$, cam-plate $s^6$, vertical rods $t^2$, and mechanism, substantially as described, whereby said paste-blade is raised and lowered, and deflected against the paste-roller, substantially as set forth.

2. In a paper-bag machine, the combination of paste-box R, paste-roller R', scraper-plate $u$, and gages $u^4$, substantially as set forth.

3. In a paper-bag machine having a paste-box, the combination of paste-roller R', ratchet-wheel 28, pawl 29, weighted lever $u'$ operating said ratchet and pawl, and horizontal paste-blade shaft $s^4$, acting upon said lever, arranged and combined as described, whereby an intermittent motion is imparted to the paste-roller, substantially as set forth.

4. In a paper-bag machine, the paper-feeding device consisting of crank G, pitman G', pivoted guide-box $G^2$, curved slotted crank O, shaft $l$, and gear-wheel P, gear-wheels P' and $P^2$, feed-cylinder N, and friction-rollers 10 10 10, set in bearings to swing on and off of the cylinder N, substantially as described.

5. In a paper-bag machine, the combination of the vertical-acting cutting-knife 15, the paper-feeding cylinder N, guide-plate $r^2$, friction-rollers 10 10 10, shaft $l$, gear-wheels P P' P², curved slotted crank O, pitman G', pivoted guide-box G², and crank G, substantially as set forth.

6. In a paper-bag machine, the combination of a continuously-moving belt with fingers K' K', beveled pieces 3 3, uprights 4 4, and screws $h\ h$, substantially as set forth.

7. In a paper-bag machine, the handle W', having rigid arm W² attached thereto, connecting-rod W³, bell-crank lever with arms 20 and 22, vertical rods $t^2$, and cross-bar $s^4$, whereby the cross-bar $s^4$, with pasting-blade attached, can be raised or lowered, substantially as set forth.

8. In a paper-bag machine, the combination of horizontal bar $s^4$, pasting-blade $t'$, crank-arm $t$, cam-plate $s^6$, slotted side frames, $s\ s$, vertical rods $t^3$, arms 20 and 22, forming a bell-crank lever, forked connecting-rod 25, and heart-shaped cam $t^3$, actuated through shaft $l$, substantially as set forth.

9. In a paper-bag machine, in combination with the shaft upon which the roll of paper rests, grooved wheel 37, pivoted lever 34—having a horizontal movement—a pin on the face of said lever entering the groove on the wheel, and slotted brace 36, with set-screw 35 entering the slot and holding the lever firmly in place, whereby a side movement is secured in the feed of the paper, substantially as set forth.

10. In combination with a paste roller and trough, a scraper, as described, having an adjustable gage on each end thereof, whereby a uniform supply of paste is applied to the roller of equal width with the blank to be pasted, substantially as set forth.

11. In a paper-bag machine, the combination of finger K', beveled pieces 3, upright 4, having top and bottom projections—the bottom projection provided with a transverse slot for set-screw 4'—bearing $i$, adjusting-screw $h$, set in said bearing and engaging with a thread in the top projection of upright 4, and cross-bar 5, whereby finger K' can be moved laterally, substantially as set forth.

W. W. COTTON.
ALFRED HEWES.

Witnesses:
ANDREW WILSON,
S. P. KITTLE.